(No Model.) 4 Sheets—Sheet 1.
W. C. KEITHLY.
CONDUIT ELECTRIC RAILWAY.

No. 517,549. Patented Apr. 3, 1894.

Witnesses
Geo. J. Kincaid
Genie L. Williams

Inventor
W. C. Keithly
by John Wedderburn
his Attorney (No Model.) 4 Sheets—Sheet 4.
W. C. KEITHLY.
CONDUIT ELECTRIC RAILWAY.
No. 517,549. Patented Apr. 3, 1894.
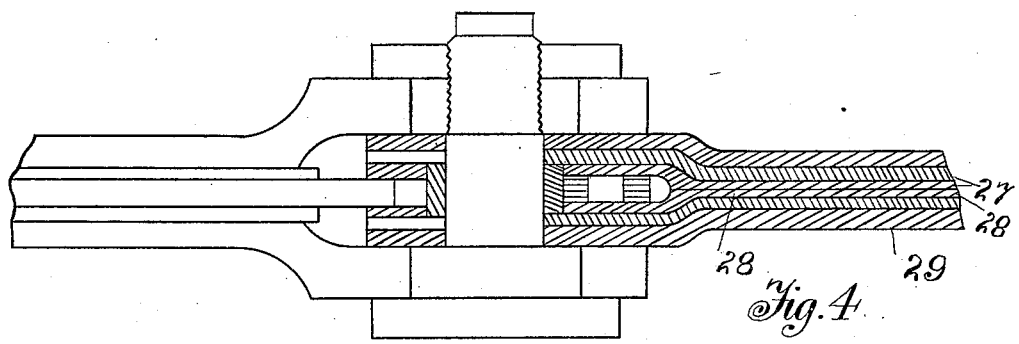
Fig. 4.
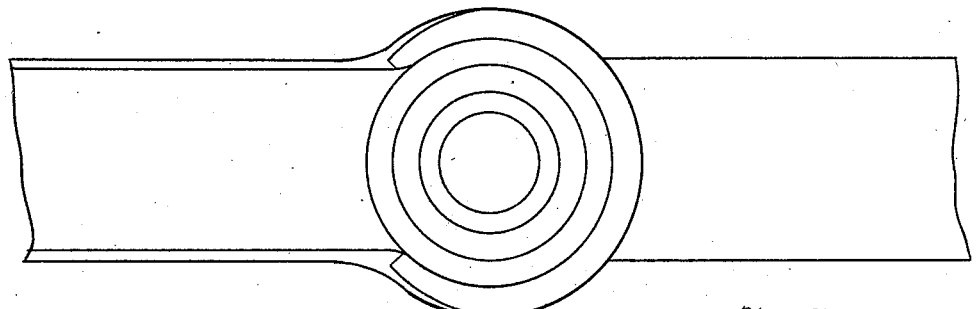
Fig. 5.
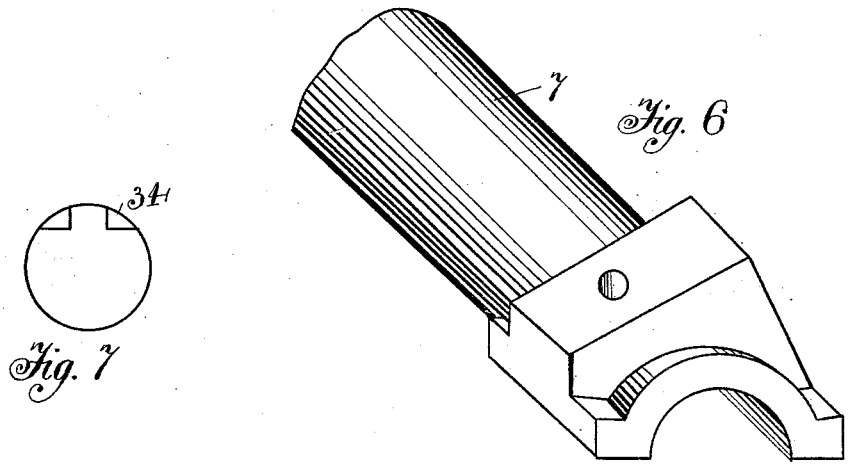
Fig. 6.
Fig. 7.
Witnesses
Geo. T. Kincaid
Genie L. Williams
Inventor
W. C. Keithly
by John Wedderburn
his Attorney

# UNITED STATES PATENT OFFICE.

WILLIE C. KEITHLY, OF SAN FRANCISCO, CALIFORNIA, ASSIGNOR OF ONE-HALF TO JO GORDON AND HERBERT F. DUGAN, OF SAME PLACE.

CONDUIT ELECTRIC RAILWAY.

SPECIFICATION forming part of Letters Patent No. 517,549, dated April 3, 1894.

Application filed September 17, 1892. Serial No. 446,233. (No model.)

*To all whom it may concern:*

Be it known that I, WILLIE C. KEITHLY, of San Francisco, in the county of San Francisco and State of California, have invented certain new and useful Improvements in Electric Railways; and I do hereby declare the following to be a full, clear, and exact description of the invention, such as will enable others skilled in the art to which it appertains to make and use the same.

My invention relates particularly to underground conduits for electric railways; and it has for its object to provide a strong, effective and durable conduit that will protect the wire from frost and moisture, and also to provide means for obtaining an even and perfect contact between the trolley and the wire, and to prevent accidental jumping and sparking, and furthermore to provide novel means for supporting the heavy trolley wire; furthermore to provide a conduit for side wire feeders, calculated to renew the current.

A further object of my invention is to provide novel means for insulating the wires to prevent deflection of the current; also means to prevent accidental contact with the wire, and means for suspending the trolley wire in the subway, furthermore to provide novel means for crossing cables or other obstructions.

My invention more particularly resides in the novel combination, construction and arrangement of parts hereinafter fully specified and pointed out in the claims, reference being had to the accompanying drawings, in which—

Figure 1:
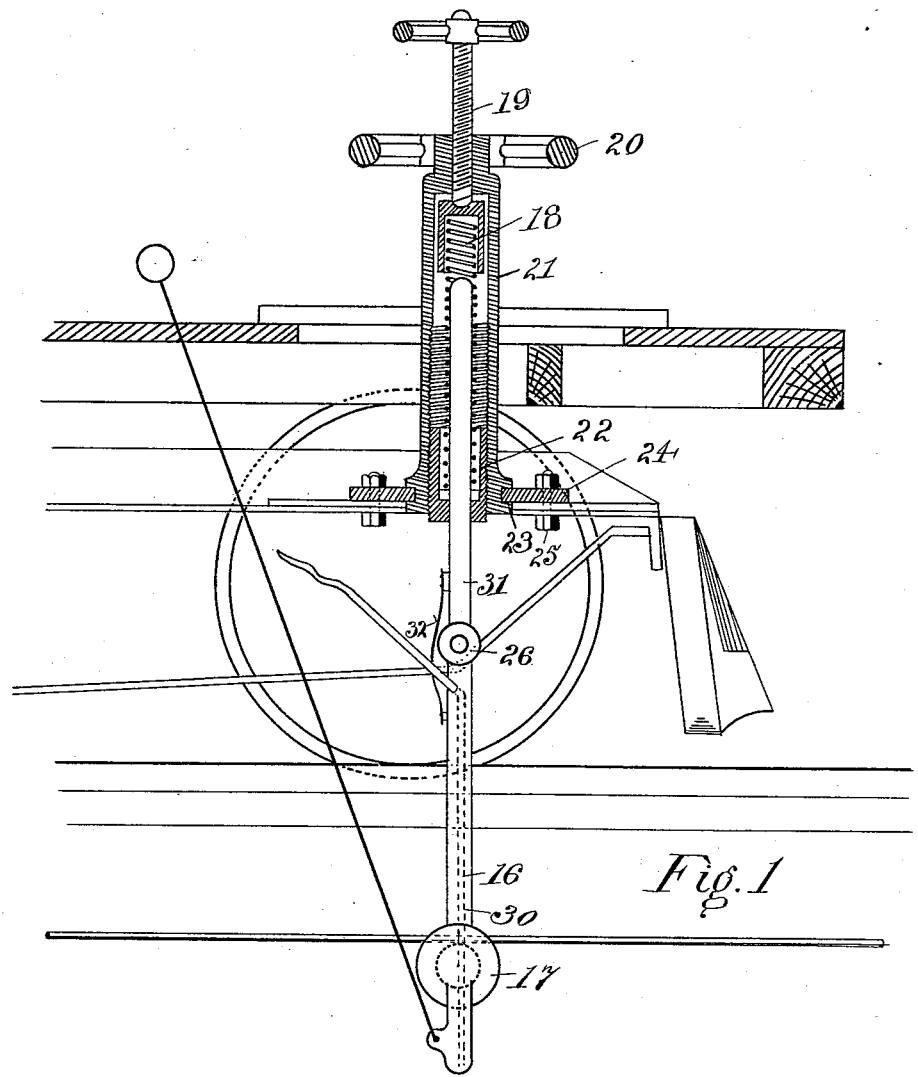
Figure 2:
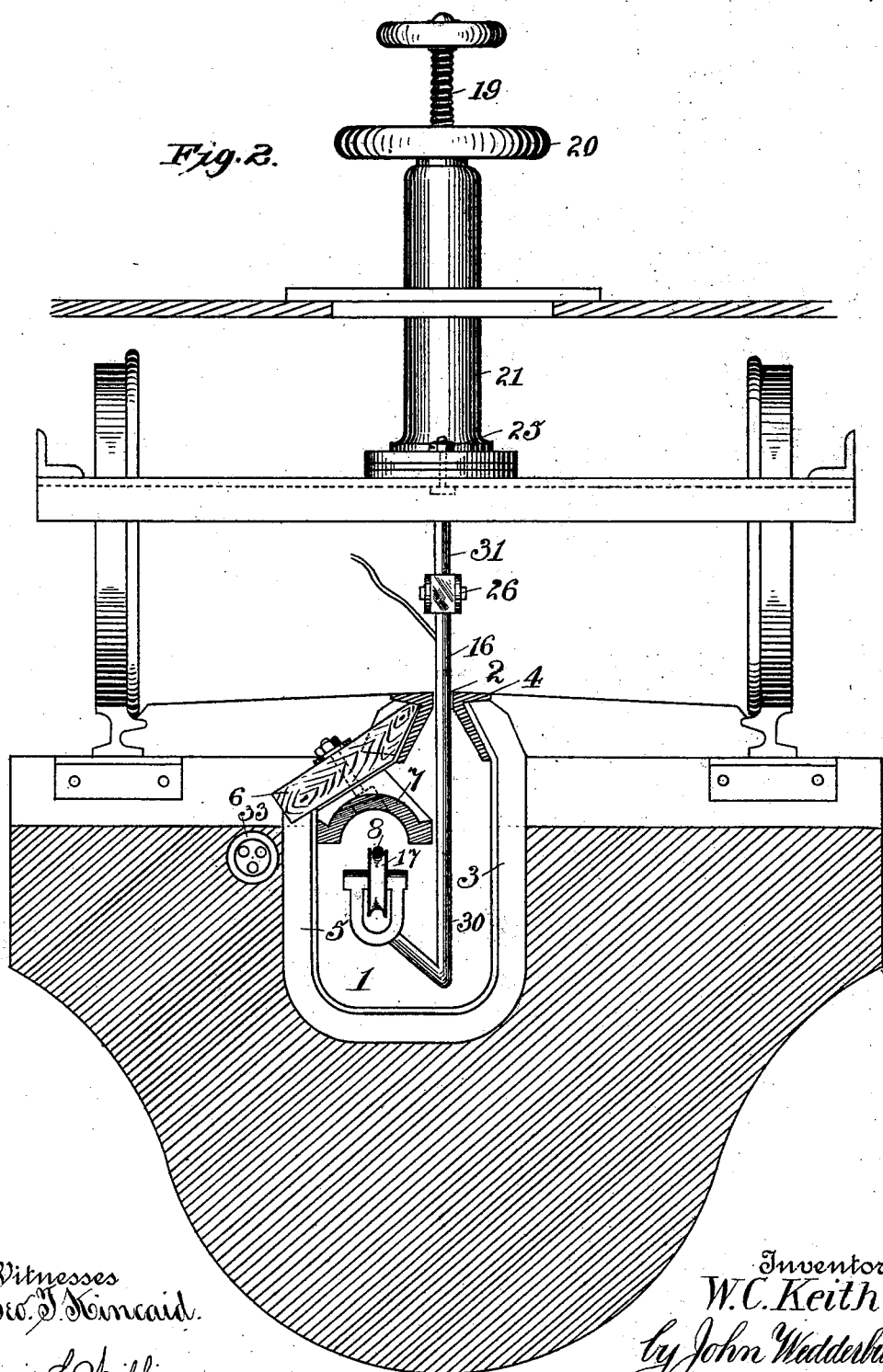
Figure 3:
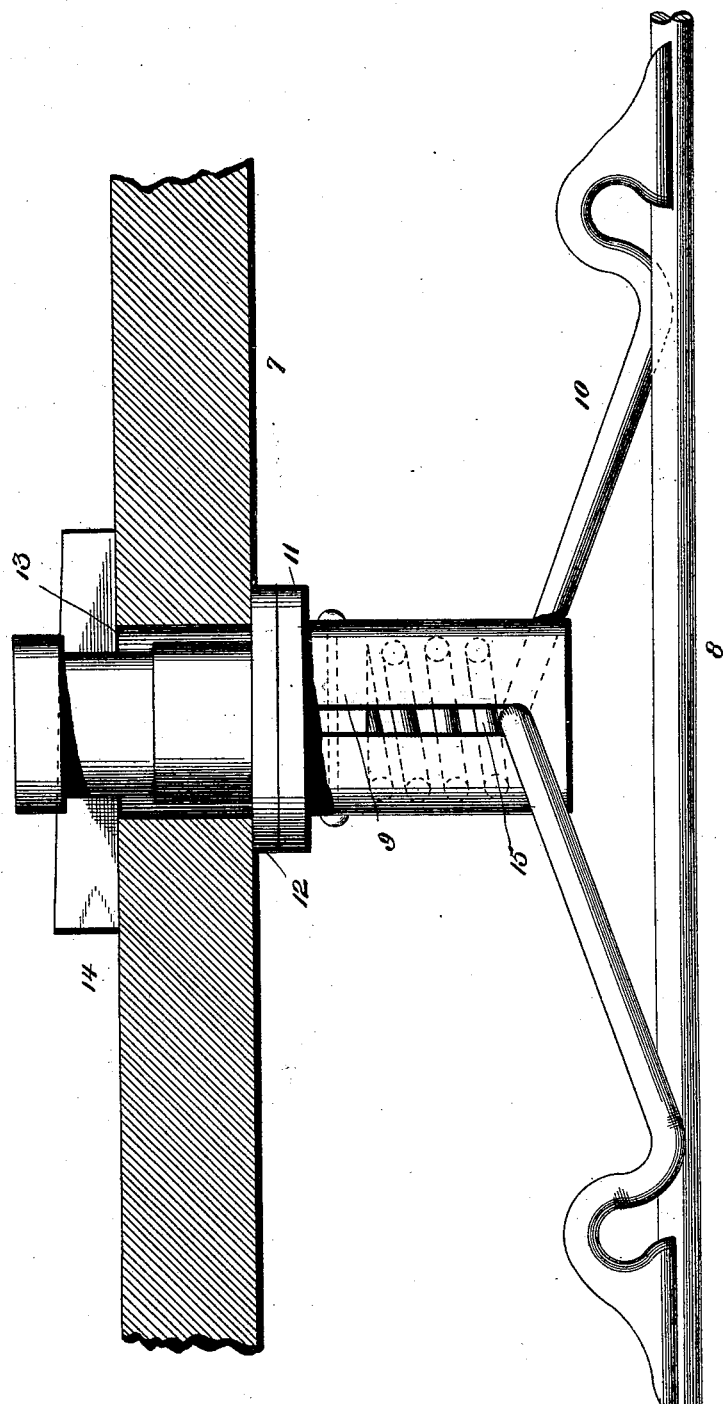

Figure 1 is a transverse vertical section of my improved conduit showing a portion of a truck and a trolley-arm inserted through the slot of the conduit. Fig. 2 is a cross section of the conduit. Fig. 3 is an enlarged detail section of the hanger to which the main wire is attached. Fig. 4 is an enlarged view and part section of the hinge in the trolley. Fig. 5 is a plan view of same. Fig. 6 is a perspective view of a section of the covering above the wire. Fig. 7 is a sectional view showing the manner of attaching the wire to the hanger.

The conduit (1) is of the shape shown in Fig. 2, and is provided at the top with the ordinary slot 2. The conduit is substantially yoke shaped with one side longer than the other, the long end 3 supporting one of the angle irons 4 which forms one side of the slot, while the angle iron on the opposite side of the slot is connected to the shorter end 5 of the yoke by means of the piece (6).

Immediately below the piece (6) and secured to it by means of bolts or otherwise is the pressed-clay or terra cotta covering (7) which is represented in Fig. (6), and which forms a water proof covering for the heavy wire (8).

One of the important parts of my invention is the manner of suspending the wire (8) from the terra cotta covering (7) which is shown on an enlarged scale in Fig. 3. It consists of a metal tube (9) which contains a slot, one on either side through which the steel wire hanger (10) passes and whose ends are secured to the wire (8) as shown in the figure. Or the arms of the hanger may come directly in contact with the spring instead of passing through the slots.

Just above the slots on the tube (9) is a flange (11) which is adapted to press against a rubber washer (12); the upper portion of the tube (9) is made of hard rubber which secures insulation, and is adapted to pass through the opening (13) in the terra cotta covering and held therein by means of the wooden key or nut on top (14). The tube (9) contains a spring (15) which exerts a downward pressure on the hanger (10) and it is readily seen that when the trolley wheel is pressed upward against the wire, the spring (15) gives and enables the trolley wheel to pass without sparking.

Although I have described my novel construction of suspending the wire in connection with my improved underground system, it will be readily seen that it is applicable to the overhead system, and in that case the wooden key would be dispensed with.

To insure rigidity, I have embedded the conduit in cement as represented in Fig. 2.

Another important feature of my invention is the form and construction of the trolley arm (16), which extends downward below the wire and then extends outward and upward, bearing at its end the trolley wheel (17). In order to keep the trolley wheel in close contact with the wire (8) I have provided a spring or springs (18), which encircles the upper portion of the trolley rod, and its pressure is regulated by means of the screw (19).

The raising or lowering of the entire trolley is effected by means of the wheel (20), which is rigidly secured to the outer casing (21) which has an internal thread at its lower end which engages the thread of a shoulder (22), which encircles the upper portion of the trolley arm.

Extending around the lower portion of the casing (21) is a groove (23) into which the plate (24) fits, thereby allowing the casing (21) to revolve freely and at the same time preventing any vertical motion. The plate (24) is secured to the car truck by means of the bolts (25), thus enabling the entire trolley to be lifted from the conduit when desired, as for instance when it is desired to change from an underground to an overhead system, without disturbing the machinery.

In Figs. 4 and 5, I have shown the manner of constructing the hinge (26), and also the manner of insulating the interior conductor of the trolley arm, which consists of having a non conducting material (27) between the interior conductor (28) and the metal casing (29). The lower portion (30) of the trolley arm is kept comparatively in the same line with the upper portion (31) by means of the spring (32) shown in Fig. 1, but when the trolley passes over a crossing cable or other obstruction the spring gives and the trolley arm swings on its hinge.

The great advantage of having the trolley arm (V)-shaped at its lower portion, is to prevent any moisture which may enter the conduit through the slot from reaching the wire as by means of my construction the moisture would follow the trolley arm and drop therefrom at the vertex of the arm.

At the side of the main conduit Fig. 2, I have represented a tube (33), which carries the feeding wires which are spliced to the main wire at convenient intervals.

In Fig. 7, I have shown the manner of attaching or soldering the wire to the hanger, which consists in grooving the upper surface (34) of the wire as shown in the figure and making a corresponding groove in the hanger and its object is to give a smooth surface to the trolley.

I do not confine myself to any particular construction of the hinge (26) and many forms may be substituted and still be within the spirit of my invention.

The construction and arrangement of the several parts of my improved electric railway system being thus made known, the operation and advantage of the same will, it is thought be readily understood.

Having thus fully described my invention, what I claim, and desire to secure by Letters Patent, is—

1. In an electric rail-way, the combination of underground conduit (1), the wire (8), covering (7) and a hanger for said wire, said hanger consisting of the tube (9), wire (10), flange (11), the upper portion of said tube (9), being made of rubber, spring (15) and means for securing said hanger in said covering, substantially as and for the purpose described.

2. In an electric rail-way, the combination of the underground conduit (1), the wire (8), the flanged hanger trolley arm (16), spring (32) and means for raising or lowering said trolley arm, substantially as and for the purpose set forth.

In testimony whereof I have signed this specification in the presence of two subscribing witnesses.

WILLIE C. KEITHLY.

Witnesses:
W. E. BOND,
J. SHERMAN MCDOWELL.